United States Patent
Hüster et al.

(10) Patent No.: US 12,194,912 B2
(45) Date of Patent: Jan. 14, 2025

(54) METHOD FOR CONTROLLING A HEADLAMP OF A MOTOR VEHICLE

(71) Applicant: Hella GmbH & Co. KGaA, Lippstadt (DE)

(72) Inventors: Christian Hüster, Salzkotten (DE); Boris Kubitza, Möhnesee-Körbecke (DE); Udo Venker, Güterlsoh (DE); Maxim Siffermann, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 146 days.

(21) Appl. No.: 18/054,193

(22) Filed: Nov. 10, 2022

(65) Prior Publication Data

US 2023/0068957 A1 Mar. 2, 2023

Related U.S. Application Data

(63) Continuation of application No. PCT/EP2020/063355, filed on May 13, 2020.

(51) Int. Cl.
*B60Q 1/08* (2006.01)
*G06V 20/58* (2022.01)

(52) U.S. Cl.
CPC .............. *B60Q 1/08* (2013.01); *G06V 20/58* (2022.01); *B60Q 2300/40* (2013.01)

(58) Field of Classification Search
CPC ....... B60Q 1/08; B60Q 2300/40; G06V 20/58
See application file for complete search history.

(56) References Cited

U.S. PATENT DOCUMENTS

| | | | | |
|---|---|---|---|---|
| 6,587,573 B1 * | 7/2003 | Stam | ...................... | B60Q 1/143 382/104 |
| 9,610,890 B2 * | 4/2017 | Hoffmann | .............. | B60Q 1/085 |
| 2002/0145883 A1 * | 10/2002 | Akizuki | ................. | F21S 41/657 362/546 |
| 2009/0279317 A1 * | 11/2009 | Tatara | ..................... | B60Q 1/143 362/465 |
| 2013/0258688 A1 * | 10/2013 | Kalapodas | ............. | B60Q 1/143 362/465 |
| 2015/0085507 A1 * | 3/2015 | Hoffmann | .............. | B60Q 1/085 362/465 |
| 2016/0250964 A1 * | 9/2016 | Takagaki | ................. | B60Q 1/08 362/466 |

FOREIGN PATENT DOCUMENTS

| | | |
|---|---|---|
| DE | 102008025808 A1 | 12/2009 |
| DE | 102009051485 A1 | 6/2010 |
| DE | 102014110628 A1 | 1/2016 |
| EP | 2338731 A1 | 6/2011 |
| EP | 2484557 A2 | 8/2012 |

* cited by examiner

*Primary Examiner* — Thomas D Alunkal
(74) *Attorney, Agent, or Firm* — Husch Blackwell LLP

(57) ABSTRACT

A method is provided for controlling a headlamp of a motor vehicle. An object is detected by an object detecting device of the motor vehicle. An angle is determined between a geometrical longitudinal axis of the motor vehicle passing through the object detecting device and a geometrical connecting line between the object detecting device and the object. A glare reduction range of the headlamp is determined using the angle without taking into account a total distance between the object and the motor vehicle, the headlamp illuminating the glare reduction range with a lower brightness than areas adjacent to the glare reduction range.

12 Claims, 3 Drawing Sheets

METHOD FOR CONTROLLING A HEADLAMP OF A MOTOR VEHICLE

CROSS REFERENCE

This application claims priority to and is a continuation of PCT Application No. PCT/EP2020/063355, filed May 13, 2020, the entirety of which is hereby incorporated by reference.

FIELD OF THE INVENTION

The invention relates to a method for controlling a headlamp of a motor vehicle.

BACKGROUND OF THE INVENTION

It is state of the art to control a motor vehicle's headlamp in a way that the risk of blinding other road users is reduced. Further, DE 10 2009 051 485 A1 discloses a method of controlling a headlamp of a motor vehicle such that objects (e.g. road signs or persons) are illuminated with a reduced brightness in comparison with other regions. Illuminating road signs with a reduced brightness is advantageous for avoiding glare effects that could distract the driver of the motor vehicle. For determining a glare reduction range with reduced brightness, the total distance between the object and the motor vehicle has to be taken into account.

BRIEF SUMMARY OF THE INVENTION

It is an object of the present invention to reduce the risk of glaring effects due to erroneously determining a partly wrong glare reduction range.

An object, for example a road sign or another road user, is detected by an object detecting device of the motor vehicle. The object detecting device may for example comprise a camera. A geometrical longitudinal axis of the motor vehicle passes through the object detecting device. In the context of this description, the geometrical longitudinal axis may mean in particular a virtual axis, which is not present as a real component of the motor vehicle. The geometrical longitudinal axis may extend in particular in a direction the motor vehicle is moved when driving straight forward. An angle is determined between the geometrical longitudinal axis and a geometrical connecting line between the object detecting device and the object. The geometrical connecting line may be in particular a virtual line, which is not present as a real component.

A glare reduction range of the headlamp is determined by using the angle and without taking into account a total distance between the object and the motor vehicle. The headlamp illuminates the glare reduction range with a lower brightness than areas adjacent to the glare reduction range. Determining the glare reduction range without taking into account the total distance is advantageous because cameras and computation units used in today's motor vehicles are not able to determine the total distance exact enough for determining the correct glare reduction range. When taking into account wrong distance values, the glare reduction range is determined incorrectly.

According to an embodiment of the invention the angle and a correction value are used for determining the glare reduction range. In particular, the angle and the correction value are exclusively used for determining the glare reduction range. For example, the correction value is added to the angle. The sum of the correction value and the angle may define a further angle between a geometrical longitudinal axis of the motor vehicle passing through the headlamp and a further geometrical connecting line between the headlamp and the object. This further angle may define an outer edge of the glare reduction range.

The correction value may for example be chosen such that road signs with a usual distance to the road are located within the glare reduction range independent of their total distance to the motor vehicle. This may for example be achieved by a constant width and/or height of the glare reduction range, which is independent of the angle and the total distance between the object and the motor vehicle. In this case, the glare reduction range is wider and higher than the object, when the object is relatively far away from the motor vehicle. However, this is neglectable because the region around the object does not necessarily have to be illuminated as strong as possible.

According to an embodiment of the invention the correction value depends on the angle. For example, the larger the angle is the larger is also the correction value. This takes into account that parallax effects are larger for larger angles. In particular, the correction value depends exclusively on the angle. This can mean that the correction value does not depend on any other values.

According to an embodiment of the invention the correction value is independent of the total distance between the object and the motor vehicle. In particular, this may mean that the correction value does not depend directly on the total distance. Of course, the angle may depend on the total distance and on the location of the object relative to the motor vehicle. Since the correction value may depend on the angle, the correction value may also depend indirectly on the total distance.

According to an embodiment of the invention the angle is a horizontal angle. In this description, the term "horizontal" means in particular a horizontal direction when the motor vehicle is used as intended with its tires on a road. Determining the horizontal angle is advantageous because often the horizontal position of the object is unknown. The vertical position of certain objects such as road signs, other road users or persons is often well known. However, the angle may also be a vertical angle because the geometrical principles of embodiments of the invention may also be applied to a vertical angle.

According to an embodiment of the invention the glare reduction range may be U-shaped. In particular, the glare reduction range may be limited by a lower edge and two side edges, wherein the lower edge extends in a horizontal direction and the side edges extend in a vertical direction. For example, the glare reduction range is not limited by an upper edge. Thus, the glare reduction range may extend to the upper end of the whole illumination range, which is illuminated by the headlamp.

According to an embodiment of the invention a width of the glare reduction range depends on the angle. This is advantageous for adjusting the width to the distance between the motor vehicle and the object.

According to an embodiment of the invention the geometrical longitudinal axis is located between the headlamp and the object. When determining the glare reduction range, exclusively an end region of the headlamp facing the geometrical longitudinal axis may be taken into account. This end region is more important than other regions of the headlamp for deglaring the object because this region determines a horizontal end of the glare reduction range. If this horizontal end is determined incorrectly, the object is at least not completely inside the glare reduction range. For example, if the motor vehicle drives on the right side of a road and the glare reduction range shall include a road sign located right from the street, the right edge of the left headlamp is taken into account for determining the glare reduction range.

According to an embodiment of the invention the geometrical connecting line passes between the object detecting device and an outer edge of the object.

According to an embodiment of the invention the outer edge of the object is the outer edge of the object that is furthest away from the geometrical longitudinal axis. This is in particular advantageous when exclusively the end region of the headlamp facing the geometrical longitudinal axis is taken into account for determining the glare reduction range because at least this end region would illuminate this outer edge when the glare reduction range would not be determined correctly due to parallax effects.

The motor vehicle according to claim 12 comprises a headlamp, an object detecting device, a determination unit and a controlling unit. The object detecting device may for example comprise a camera. The object detecting device is adapted to detect an object. For example, a camera may detect the object by taking an image or a video showing the object. The determination unit is adapted to determine an angle between a geometrical longitudinal axis of the motor vehicle passing through the object detecting device and a geometrical connecting line between the object detecting device and the object. The controlling unit is adapted to determine a glare reduction range of the headlamp by using the angle without taking into account a total distance between the object and the motor vehicle. The headlamp is adapted to illuminate the glare reduction range with a lower brightness than areas adjacent to the glare reduction range.

Features described with respect to the method may also be present in the corresponding components of the motor vehicle. Terms explained with respect to the method may have a similar or the same meaning when being mentioned in connection with the motor vehicle.

According to an embodiment of the invention the object detecting device is adapted to transmit image data to the determination unit. The image data may comprise image data of the object and a surrounding of the object. The determination unit may be adapted to determine the angle by using the image data.

According to an embodiment of the invention the determination unit is adapted to perform one or several steps of a method according to an embodiment of the invention.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
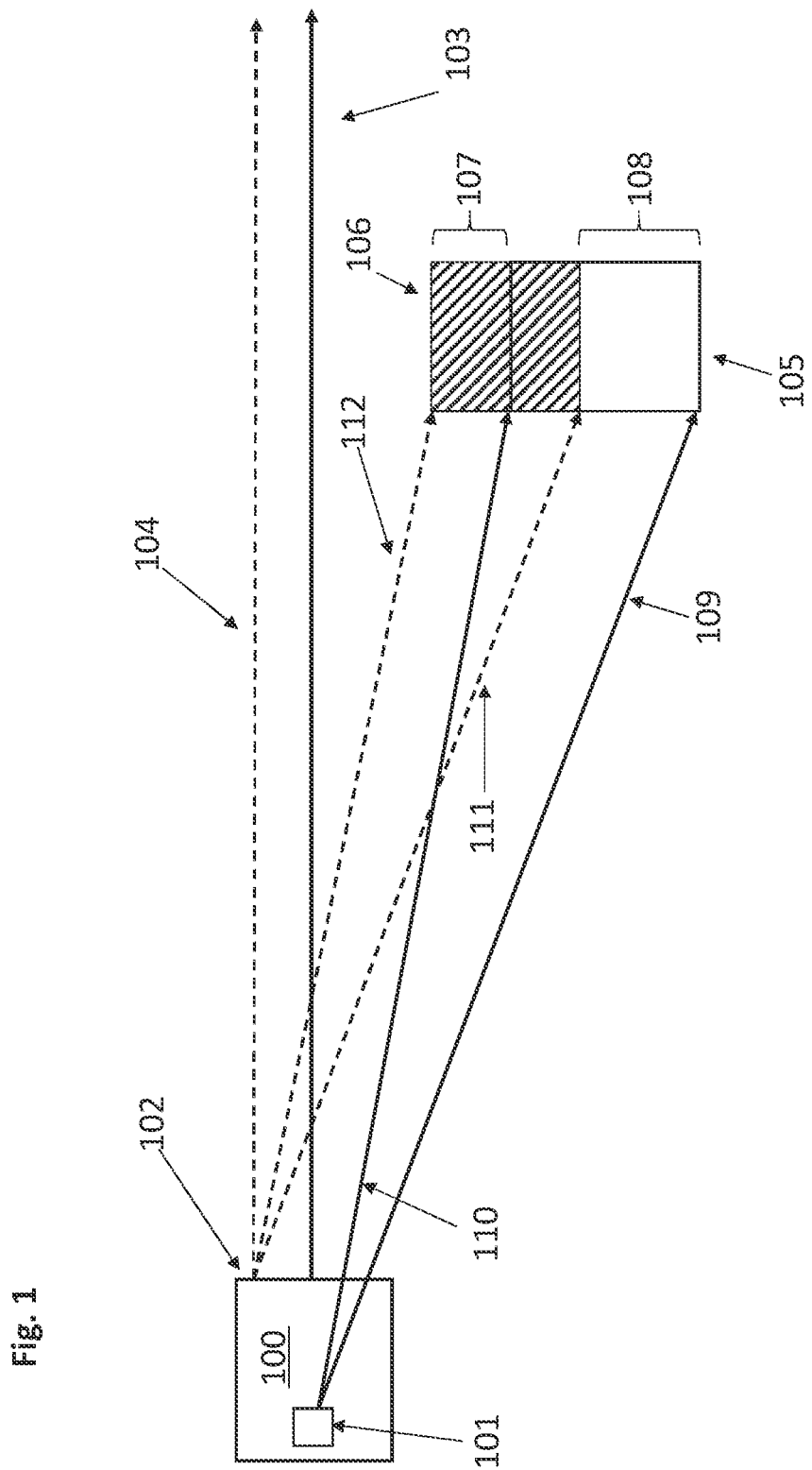
FIG. 1 shows a schematic view of a motor vehicle according to an embodiment of the invention from above illuminating an object.

Since FIG. 1 is a schematic view from above, only the horizontal positions of the glare reduction range, the geometrical connecting lines, the object and all other components depicted in FIG. 1 are described with respect to FIG. 1

The motor vehicle 100 comprises an object detecting device 101 and a headlamp 102. The object detecting device 101 may comprise a camera. In FIG. 1, a geometrical longitudinal axis 103 is shown that passes the object detecting device 101. A further geometrical longitudinal axis 104 is also shown in FIG. 1. The further geometrical longitudinal axis 104 passes the headlamp 102. Both geometrical longitudinal axes 103 and 104 are not present as real components. They are merely virtual axes that are used in this description to explain the functions of the embodiment of the invention shown in FIG. 1.

The object detecting device 101 detects the object 105. A first geometrical connecting line 109 runs between the object detecting device 101 and a first outer edge of the object 105. A second geometrical connecting line 110 runs between the object detecting device 101 and a second outer edge of the object 105. Thus, when neglecting parallax effects, a first end of a glare reduction range, which corresponds to the size and position of the object, could be determined by defining a third geometrical connecting line 111 that starts from the headlamp 102 and extends parallel to the first geometrical connecting line 109. A second end of the glare reduction range could be determined by defining a fourth geometrical connecting line 112 that starts from the headlamp 102 and extends parallel to the second geometrical connecting line 110.

Due to parallax effects the resulting glare reduction range 106 is not congruent to the object 105. Thereby the region 108 of the object 105 is not part of the glare reduction range 106. This could lead to a driver being distracted by glare effects. Further, the region 107 is part of the glare reduction range 106 although the object 105 does not extend into the region 107.

Therefore, a correction value is used for determining a glare reduction range 106 that comprises the whole object 105. As already stated, it is more important to correct the third geometrical connecting line 111 in order to extend the glare reduction at least to the whole object 105. For example, the correction value may be added to the angle between the first geometrical connecting line 109 and the geometrical longitudinal axis 103 running through the object detecting device 101. The sum may then be used for defining a corrected third geometrical connecting line. The corrected third geometrical connecting line may be defined by enclosing an angle with the further geometrical longitudinal axis 104 that corresponds to the sum.

It is advantageous to make the correction value dependent on the angle between the first geometrical connecting line 109 and the geometrical longitudinal axis 103. This takes into account that usually the angle between the first geometrical connecting line 109 and the geometrical longitudinal axis 103 is larger the nearer the object 105 is. However, in practice the object 105 or other objects are not always at the same horizontal distance to the motor vehicle 100. Thus, the angle between the first geometrical connecting line 109 and the geometrical longitudinal axis 103 depends also on this horizontal distance.

Figure 3:
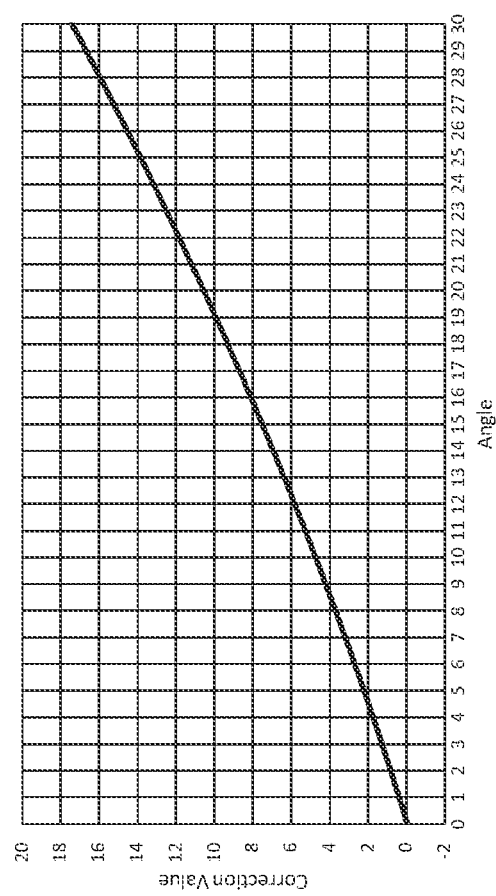
FIG. 3 shows a schematic diagram of a correction value dependent on an angle between a longitudinal axis and a connecting line between an object detecting device and an object.

For taking into account different horizontal distances of the object 105, practical exercises have shown for horizontal distances between 1 and 30 meters suitable correction values as shown in FIG. 3. The unit of both axes in FIG. 3 is degrees. The correction value for an angle of 10° between the first geometrical connecting line 109 and the geometrical longitudinal axis 103 lies between 3° and 6°. The correction value for an angle of 20° between the first geometrical connecting line 109 and the geometrical longitudinal axis 103 lies between 9° and 12°. The correction value for an angle of 5° between the first geometrical connecting line 109 and the geometrical longitudinal axis 103 lies between 1° and 4°.

The correction values are chosen in order to define a glare reduction range that comprises the object 105.

Figure 2:
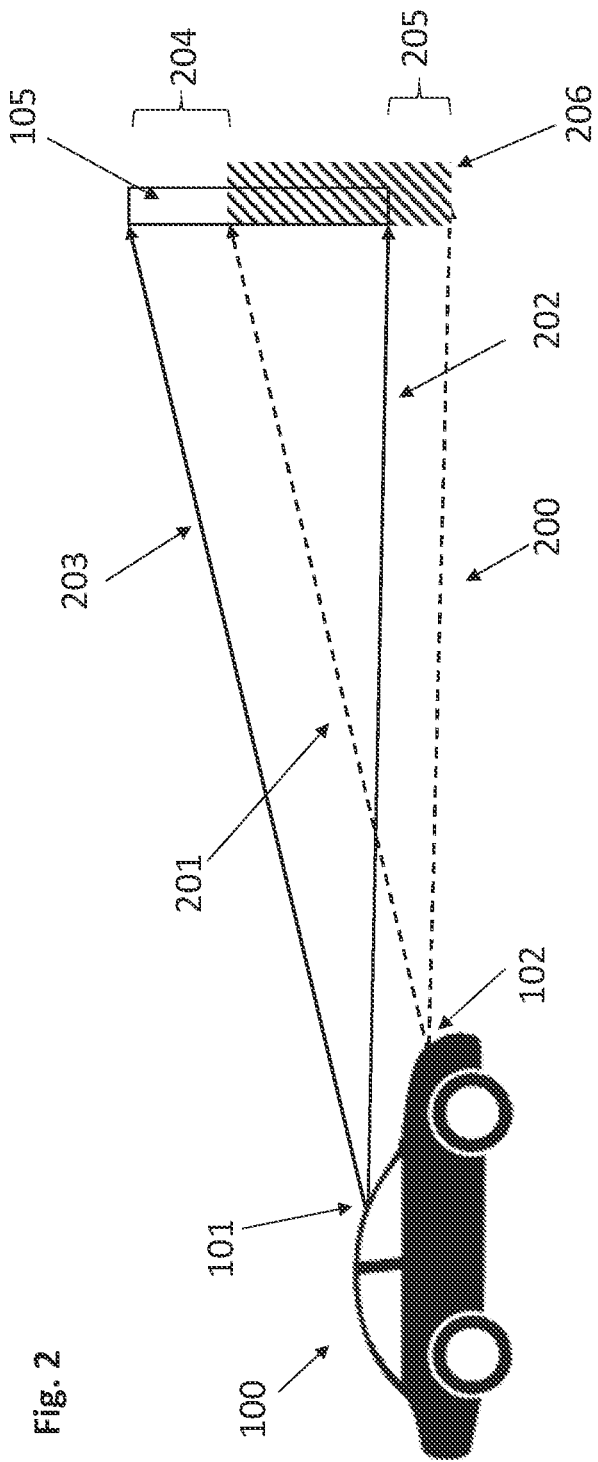
FIG. 2 shows a schematic side view of a motor vehicle according to an embodiment of the invention illuminating an object.

In FIG. 2 a similar principle is shown for determining a glare reduction range comprising the object 105. A fifth geometrical connecting line 202 is located between the object detecting device 101 and the lower edge of the object 105. A sixth geometrical connecting line 203 is located between the object detecting device 101 and the upper edge of the object 105. A seventh geometrical connecting line 200 is arranged parallel to the fifth geometrical connecting line 202 and originates from the headlamp 102. An eighth geometrical connecting line 201 is arranged parallel to the sixth geometrical connecting line 203 and originates from the headlamp 102.

Using the seventh geometrical connecting line 200 and the eighth geometrical connecting 201 would result in a glare reduction range 206 that is not congruent to the object 105. The region 204 of the object 105 is not part of the glare reduction range 206. This could lead to a driver being distracted by glare effects. Further, the region 205 is part of the glare reduction range 206 although the object 105 does not extend into the region 205.

The glare reduction range 206 needs to be corrected in order to reduce the risk of glaring effects. This can be done for the vertical angles of the seventh geometrical connecting line 200 and the eighth geometrical connecting line 201 in a similar way as explained with respect to FIG. 3 for horizontal angles. For vertical angles a correction value can be determined, which is added to the angle between the respective geometrical connecting line 200 or 201 and the geometrical longitudinal axis 104 that runs through the headlamp 102. The correction value can be calculated for different vertical distances between the object 105 and the motor vehicle 100. Then, a correction value is chosen that reduces the risk of glaring effects. Because the total distance between the object 105 and the car 100 is unknown the resulting glare reduction range will most likely comprise regions adjacent to the object 105. This is accepted in order to reduce the risk of glaring effects. Similar to the correction value for the horizontal angle, the correction value for the vertical angle preferably depends on the angle between the sixth geometrical connecting line 203 and the geometrical longitudinal axis 103 that runs through the object detecting device 101.

LIST OF REFERENCE SIGNS

100 Motor vehicle
101 Object detecting device
102 Headlamp
103 Geometrical longitudinal axis
104 Geometrical longitudinal axis
105 Object
106 Glare reduction range
107 Region
108 Region
109 First geometrical connecting line
110 Second geometrical connecting line
111 Third geometrical connecting line
112 Fourth geometrical connecting line
200 Seventh geometrical connecting line
201 Eighth geometrical connecting line
202 Fifth geometrical connecting line
203 Sixth geometrical connecting line
204 Region
205 Region
206 Glare reduction range

The invention claimed is:

1. A method for controlling a headlamp of a motor vehicle, the method comprising the following steps:
   detecting an object by an object detecting device of the motor vehicle;
   determining an angle between a geometrical longitudinal axis of the motor vehicle, the geometrical longitudinal axis defined by a line passing through the object detecting device and oriented parallel with respect to a direction of motion of the motor vehicle, and a geometrical connecting line between the object detecting device and the object;
   determining a glare reduction range of the headlamp using the angle without taking into account a total distance between the object and the motor vehicle, the headlamp illuminating the glare reduction range with a lower brightness than areas adjacent to the glare reduction range.

2. The method according to claim 1, wherein the angle and a correction value are used for determining the glare reduction range.

3. The method according to claim 2, wherein the correction value depends on the angle.

4. The method according to claim 2, wherein the correction value is independent of the total distance between the object and the motor vehicle.

5. The method according to claim 1, wherein the angle is a horizontal angle.

6. The method according to claim 1, wherein the glare reduction range is U-shaped.

7. The method according to claim 1, wherein a width of the glare reduction range depends on the angle.

8. The method according to claim 1, wherein the geometrical longitudinal axis is located between the headlamp and the object and in that, when determining the glare reduction range, exclusively an end region of the headlamp facing the geometrical longitudinal axis is taken into account.

9. The method according to claim 1, wherein the geometrical connecting line passes between the object detecting device and an outer edge of the object.

10. The method according to claim 9, wherein the outer edge of the object is the outer edge that is furthest away from the geometrical longitudinal axis.

11. A motor vehicle comprising:
   a headlamp,
   an object detecting device for detecting an object, and
   a determination unit determining an angle between a geometrical longitudinal axis of the motor vehicle, the geometrical longitudinal axis defined by a line passing through the object detecting device and oriented parallel with respect to a direction of motion of the motor vehicle, and a geometrical connecting line between the object detecting device and the object, and
   wherein the determination unit determines a glare reduction range of the headlamp using the angle without taking into account a total distance between the object and the motor vehicle,
   wherein the headlamp is adapted to illuminate the glare reduction range with a lower brightness than areas adjacent to the glare reduction range.

12. The motor vehicle according to claim 11, wherein the object detecting device transmits image data to the determination unit, the image data including image data of the object and a surrounding of the object, wherein the determination unit determines the angle by using the image data.

* * * * *